(12) United States Patent
Wang et al.

(10) Patent No.: US 12,620,190 B2
(45) Date of Patent: May 5, 2026

(54) METHOD AND APPARATUS FOR TRANSFERRING FACIAL EXPRESSION OF DIGITAL HUMAN, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Lei Wang, Beijing (CN); Xiaodong Zhang, Beijing (CN); Shiyan Li, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 130 days.

(21) Appl. No.: 18/748,082

(22) Filed: Jun. 19, 2024

(65) Prior Publication Data

US 2025/0124679 A1 Apr. 17, 2025

(30) Foreign Application Priority Data

Oct. 16, 2023 (CN) ......................... 202311339427.X

(51) Int. Cl.
G06T 7/33 (2017.01)
G06F 18/20 (2023.01)
(Continued)

(52) U.S. Cl.
CPC .............. G06T 19/20 (2013.01); G06F 18/29 (2023.01); G06T 7/344 (2017.01); G06T 7/75 (2017.01);
(Continued)

(58) Field of Classification Search
CPC G06T 17/00; G06T 17/20; G06T 7/30; G06T 2207/30201; G06T 2219/2004
See application file for complete search history.

(56) References Cited

U.S. PATENT DOCUMENTS 11,270,489 B2 * 3/2022 Jin ........................... G06T 17/00
12,361,751 B2 * 7/2025 Yan ...................... G06N 3/0475
(Continued)

FOREIGN PATENT DOCUMENTS

CA 3074547 A1 * 9/2020 ........... G06V 40/174
CN 109190582 A 1/2019
(Continued)

OTHER PUBLICATIONS

First Office Action for JP2024-100033, issued on Jun. 10, 2025, 7 pgs.

(Continued)

*Primary Examiner* — Antonio A Caschera
(74) *Attorney, Agent, or Firm* — Kwan & Olynick LLP

(57) ABSTRACT

Method and apparatus for transferring facial expression of digital human, electronic device, and storage medium which relates to the fields of augmented reality technologies, virtual reality technologies, computer vision technologies, deep learning technologies, or the like, and can be applied to scenarios, such as metaverse, a virtual digital human, or the like, An implementation includes: selecting an identification of a target reference model matched with an object model from a preset reference model library; the reference model library including a plurality of reference models; acquiring an expression library of the target reference model based on the identification of the target reference model; and transferring a last frame of an expression in the expression library of the target reference model into the object model to obtain a last frame of an expression of the object model.

20 Claims, 5 Drawing Sheets

(51) Int. Cl.
    *G06T 7/73*     (2017.01)
    *G06T 19/20*     (2011.01)

(52) U.S. Cl.
    CPC    *G06T 2200/24* (2013.01); *G06T 2207/30201* (2013.01); *G06T 2210/56* (2013.01); *G06T 2219/2004* (2013.01)

(56)       References Cited

U.S. PATENT DOCUMENTS

| | | |
|---|---|---|
| 2016/0148041 A1 | 5/2016 | Kim et al. |
| 2018/0189553 A1 | 7/2018 | Guo et al. |
| 2019/0371039 A1 | 12/2019 | Xiong et al. |

FOREIGN PATENT DOCUMENTS

| | | |
|---|---|---|
| CN | 113920569 A | 1/2022 |
| CN | 114782592 A | 7/2022 |
| CN | 115661309 A | 1/2023 |
| CN | 116309017 A | 6/2023 |
| CN | 116524165 A | 8/2023 |
| EP | 1308892 A2 | 5/2003 |
| JP | 2007184777 A | 7/2007 |
| JP | 2009075880 A | 4/2009 |
| KR | 101734212 B1 | 5/2017 |
| KR | 101902553 B1 | 9/2018 |
| KR | 20210126697 A | 10/2021 |

OTHER PUBLICATIONS

Notice of Allowance or JP2024-100033, issued on Aug. 26, 2025, 1 pg.
First office action for CN202311339427.X issued on Aug. 21, 2024, 11 pgs.
Notice of allowance or CN202311339427.X issued on Oct. 15, 2024, 7 pgs.
Ren Yushu, Research on Video based Micro expression Detection and Recognition Algorithm, dated Apr. 15, 2022, 2 pgs.
Zhijun Zhai, et al., Feature Representation Learning with Adaptive Displacement Generation and Transormer Fusion for Micro-Expression Recognition, 2023 IEEE/CVF Conference on Computer Vision and Pattern Recognition, Aug. 22, 2023, 10 pgs.
First Office Action for KR10-2024-0115577, issued on Mar. 14, 2026, 9 pgs.

* cited by examiner

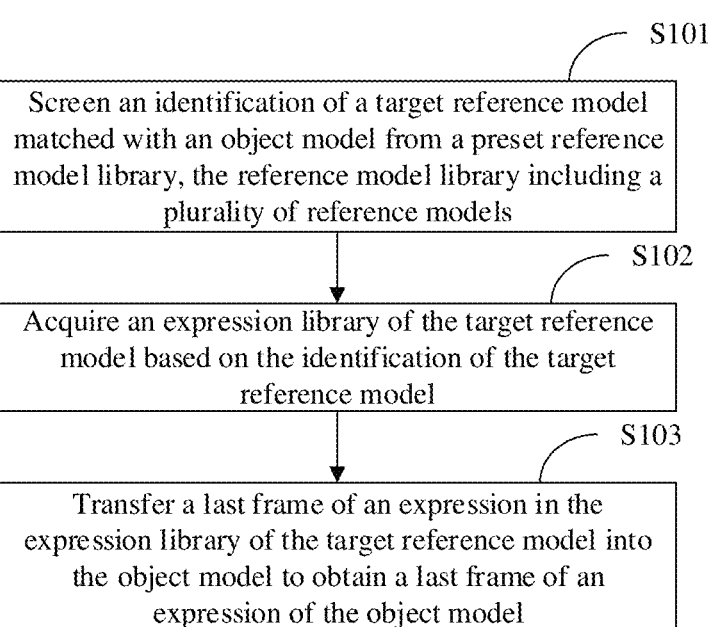

S101

Screen an identification of a target reference model matched with an object model from a preset reference model library, the reference model library including a plurality of reference models

S102

Acquire an expression library of the target reference model based on the identification of the target reference model

S103

Transfer a last frame of an expression in the expression library of the target reference model into the object model to obtain a last frame of an expression of the object model

Fig. 1

METHOD AND APPARATUS FOR TRANSFERRING FACIAL EXPRESSION OF DIGITAL HUMAN, ELECTRONIC DEVICE, AND STORAGE MEDIUM

The present application claims priority to Chinese Patent Application No. 202311339427.X, entitled "Method and apparatus for transferring facial expression of digital human, electronic device, and storage medium", filed on Oct. 16, 2023, the disclosure of which is incorporated herein by reference in its entirety.

FIELD OF THE DISCLOSURE

The present disclosure relates to the fields of computer technologies and artificial intelligence technologies, and particularly to the fields of augmented reality technologies, virtual reality technologies, computer vision technologies, deep learning technologies, or the like, which can be applied to scenarios, such as metaverse, a virtual digital human, or the like. In particular, the present disclosure relates to method and apparatus for transferring facial expression of digital human, electronic device, and storage medium.

BACKGROUND OF THE DISCLOSURE

As a key design link of digital human figure driving, binding can realize application of an expression of a digital human to a model of the digital human. In the prior art, binding is usually done by a professional designer. The form of binding includes blendshape deformation and skeleton skinning, and a blendshape deformation and a skeleton skinning can be combined to realize optimization in certain scenarios.

For different digital human figures, binding work also requires different investments. It should be noted that a time period thereof is not short, and is usually 1 to 2 weeks or more. This time cost may be further greatly increased under a high quality expression driving effect requirement of an ultra-realistic digital human.

SUMMARY OF THE DISCLOSURE

The present disclosure provides method and apparatus for transferring facial expression of digital human, electronic device, and storage medium.

According to an aspect of the present disclosure, there is provided a method for transferring facial expression of digital human, including:

screening an identification of a target reference model matched with an object model from a preset reference model library, the reference model library including a plurality of reference models;

acquiring an expression library of the target reference model based on the identification of the target reference model; and transferring a last frame of an expression in the expression library of the target reference model into the object model to obtain a last frame of an expression of the object model.

According to another aspect of the present disclosure, there is provided an electronic device, including:

at least one processor; and a memory connected with the at least one processor communicatively;

wherein the memory stores instructions executable by the at least one processor to enable the at least one processor to perform a method for transferring facial expression of digital human, the method for transferring facial expression of digital human including:

screening an identification of a target reference model matched with an object model from a preset reference model library, the reference model library including a plurality of reference models;

acquiring an expression library of the target reference model based on the identification of the target reference model; and transferring a last frame of an expression in the expression library of the target reference model into the object model to obtain a last frame of an expression of the object model.

According to still another aspect of the present disclosure, there is provided a non-transitory computer readable storage medium with computer instructions stored thereon, wherein the computer instructions are used for causing a computer to perform a method for transferring facial expression of digital human, the method for transferring facial expression of digital human including:

screening an identification of a target reference model matched with an object model from a preset reference model library, the reference model library including a plurality of reference models;

acquiring an expression library of the target reference model based on the identification of the target reference model; and transferring a last frame of an expression in the expression library of the target reference model into the object model to obtain a last frame of an expression of the object model.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF DRAWINGS

The drawings are used for better understanding the present solution and do not constitute a limitation of the present disclosure. In the drawings, FIG. 1 is a schematic diagram according to a first embodiment of the present disclosure;

DETAILED DESCRIPTION OF PREFERRED EMBODIMENTS

Figure 2:
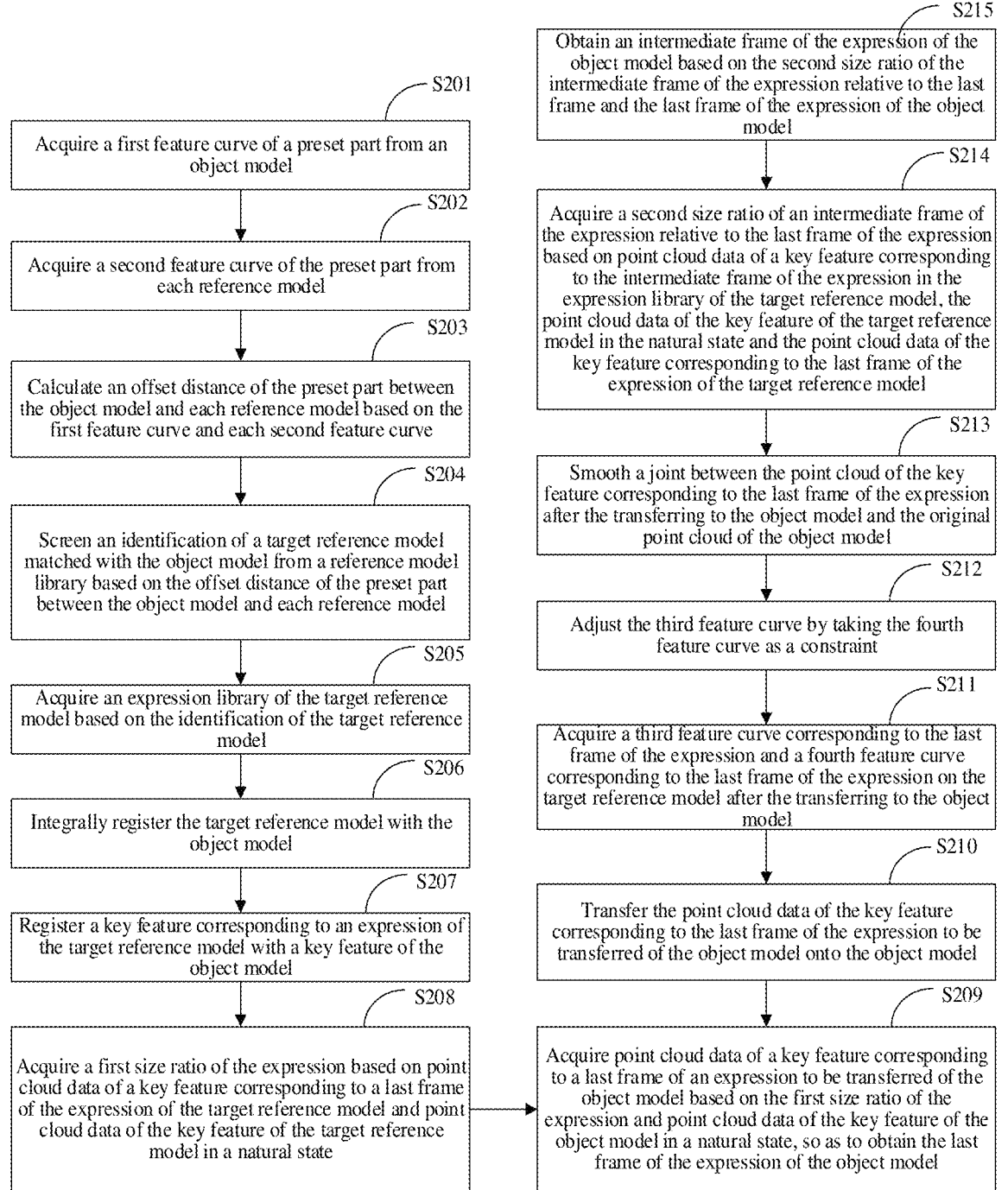
FIG. 2 is a schematic diagram according to a second embodiment of the present disclosure.

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and structures are omitted in the descriptions below.

Apparently, the embodiments to be described are merely a part rather than all of the embodiments of the present disclosure. All other embodiments obtained by a person of ordinary skill in the art based on the embodiments of the present disclosure without creative efforts shall fall within the protection scope of the present disclosure.

It should be noted that a terminal device in the embodiments of the present disclosure may include, but is not limited to, a mobile phone, a personal digital assistant (PDA), a wireless handheld device, a tablet computer, and other smart devices; a display device may include, but not limited to, a personal computer, a television, and other devices with a display function.

In addition, the term "and/or" only describes an association relationship between associated objects, and indicates that three relationships may exist. For example, A and/or B may indicate three cases: only A exists; both A and B exist; and only B exists. In addition, in this specification, the symbol "/" generally indicates that associated objects have a relationship of "or".

In the prior art, binding of an expression to a digital human is mainly artificially completed by a professional designer, and the whole process is troublesome and labor-consuming, resulting in a quite low expression binding efficiency. Based on this, the present disclosure provides a method for transferring facial expression of digital human, which can automatically transfer an expression of a reference model to an object model of one digital human, thereby effectively improving an efficiency of binding the expression to a figure of the digital human.

FIG. 1 is a schematic diagram according to a first embodiment of the present disclosure. As shown in FIG. 1, the present embodiment provides a method for transferring facial expression of digital human, which may include the following steps:

S101: screening an identification of a target reference model matched with an object model from a preset reference model library, the reference model library including a plurality of reference models.

An apparatus for transferring facial expression of digital human may serve as the subject for executing the method for transferring facial expression of digital human according to the present embodiment, and the apparatus may be configured as an electronic entity or software-integrated application. The apparatus can transfer an expression of any reference model in the reference model library to any object model, so as to realize automatic migration of the expression of the digital human.

The object model in the present embodiment is a digital human model in which the expression is to be used. The preset reference models in the reference model library are digital human models with various forms and various styles configured in advance, and for example, the models may include a male model and a female model, or may further include a boy model, a middle-aged male model, an elderly male model, a girl model, a middle-aged female model, an elderly female model, or the like. Specifically, various reference models may be preset according to requirements, and are not limited herein.

The identification of the target reference model in the present embodiment is any identification capable of identifying the target reference model, and is not limited herein.

S102: acquiring an expression library of the target reference model based on the identification of the target reference model.

In the present embodiment, expression libraries may be pre-configured for various preset reference models, and the expression library of each reference model may include multiple expressions. Specifically, the various expressions may be stored in the form of point cloud data. For example, a natural state of the reference model is a state in which the digital human does not make any expression, and the natural state may also become a standard state. If one expression is applied to the digital human of the reference model, a position of a point cloud on the reference model executing the expression is inevitably driven to be changed, and a position of a point cloud not executing the expression is not changed. Therefore, only the point cloud data which changes when the expression is executed may be stored in the expression of the reference model.

S103: transferring a last frame of an expression in the expression library of the target reference model into the object model to obtain a last frame of an expression of the object model.

In an actual application scenario, a lot of expressions have small action amplitudes, and the expression library only includes point cloud data of last frames of the expressions, that is, only records final states of the expressions. At this point, during an expression migration, the last frame of the expression in the expression library of the target reference model may be transferred into the object model to obtain the last frame of the expression of the object model.

The expression migration of the present embodiment is used for transferring the last frame of the expression of the target reference model in the reference model library matched with the object model to the object model, such that the expression can be automatically, accurately and efficiently transferred.

In the method for transferring facial expression of digital human according to the present embodiment, by adopting the above solution, the expression in the expression library of the target reference model matched with the object model can be automatically transferred into the object model. Compared with the prior art, the professional designer is not required to perform manual binding, time and labor are saved, accuracy of the transferred expression can be effectively ensured, a migration efficiency of the expression of the digital human can be effectively improved, and a generation efficiency of the figure of the digital human is improved.

FIG. 2 is a schematic diagram according to a second embodiment of the present disclosure. The technical solution of the present embodiment of the present disclosure is further described in more detail based on the technical solution of the above-mentioned embodiment shown in FIG. 1. As shown in FIG. 2, the method for transferring facial expression of digital human according to the present embodiment may include the following steps:

S201: acquiring a first feature curve of a preset part from an object model;

S202: acquiring a second feature curve of the preset part from each reference model;

S203: calculating an offset distance of the preset part between the object model and each reference model based on the first feature curve and each second feature curve; and S204: screening an identification of a target reference model matched with the object model from a reference model library based on the offset distance of the preset part between the object model and each reference model.

The above steps S201-S204 in the present embodiment are a specific implementation of the step S101 in the above-mentioned embodiment shown in FIG. 1.

Since differences between different digital human figures are mainly represented on the face, the preset part of the present embodiment may refer to a part of the face, such as the eye, the mouth, etc. For example, the first feature curve may be at least one of an upper eyelid curve, a lower eyelid curve, an upper-eyelid outer contour curve, a lower-eyelid outer contour curve, an inner canthus divergence curve, and an outer canthus divergence curve. Or, the first feature curve may be at least one of a plurality of curves, such as an upper-lip inner line, an upper-lip outer line, an occlusion line, or the like, of the mouth. For digital human figure models, such as the object model and the reference model, numbers and distributions of point clouds included in the same preset part are the same. That is, corresponding points exist between the two models at the same preset part.

In the present embodiment, when the steps S201-S204 are performed, only one preset part may be selected, or two or more preset parts may be selected. For the same preset part, only one first feature curve can be obtained from the object model, and one corresponding second feature curve can be obtained from each reference model; or, two or more first feature curves may be obtained from the object model, and two or more corresponding second feature curves may be obtained from each reference model.

If only one preset part is selected, and one first feature curve and one second feature curve participate in the screening, points included on the first feature curve and the second feature curve are distributed in the same way, and have same numbers. At this point, the step S203 may include the following steps during implementation:

(a1) acquiring coordinates of each point on the first feature curve and each second feature curve.

The coordinates of each point on the first feature curve and each second feature curve can be obtained from model data of the object model and each reference model.

(b1) calculating a distance of points with same point identifications on the first feature curve and each second feature curve based on the coordinates of the points on the first feature curve and each second feature curve.

In the object model and the reference model, the same point identifications can be used for the points with corresponding distributions. For example, points identified as 1, 2, 3, 4, 5, 6 may be included on the first feature curve of the preset part of the object model, and correspondingly, points identified as 1, 2, 3, 4, 5, 6 may also be included on the second feature curve of the same preset part of the reference model corresponding to the first feature curve. The points with the same identifications are the points with the same distributions and corresponding positions. However, the coordinates of the points with the same identifications in the two different models are not necessarily the same.

Specifically, the distance of the points with the same point identifications may be calculated according to the coordinates of two points with same point identifications on the first feature curve and each second feature curve.

(c1) adding the distances of the points with the point identifications on the first feature curve and each second feature curve to obtain a point distance sum.

(d1) obtaining an offset distance of the preset part between the object model and each reference model based on the point distance sum and a number of the points included on the first feature curve.

Specifically, the number of the points included on the first feature curve is the same as a number of the points included on each of the second feature curves.

For example, for the second feature curve of any reference model, the distances of the points with the point identifications on the first feature curve and the corresponding second feature curve are added to obtain the point distance sum. And then, the point distance sum is divided by the number of the points included on the first feature curve to obtain an average distance of each point as the offset distance of the preset part between the object model and the reference model. In this way, the offset distance of the preset part between the object model and the reference model can be accurately calculated.

At this point, when the step S204 is implemented correspondingly, an identification of the reference model with the minimum offset distance of the preset part may be screened from the multiple reference models in the reference model library as the identification of the target reference model matched with the object model. In this way, the target reference model matched with the object model can be accurately and efficiently obtained.

Optionally, in one embodiment of the present disclosure, for any reference model, in order to accurately calculate the offset distance of the preset location between the object model and the reference model, before the step (a1) is performed, point cloud registration is required to be performed on the first feature curve and the second feature curve. When the registration is not performed and the first feature curve and the second feature curve have a large distance, even if shapes and distributions of the first feature curve and the second feature curve are completely the same, the calculated offset distance of the preset part between the object model and the reference model is large, and a large error exists. In the point cloud registration of the first feature curve and the second feature curve in the present embodiment, the second feature curve is also operated using at least one of shifting, rotating and scaling, such that the first feature curve and the second feature curve have most common characteristics, for example, have a same centroid, most intersections, or the like. During the registration, an optimal registration position can be obtained through a plurality of trial operations until a position when the sum of the point distances between the first feature curve and the second feature curve is found as a registration position of the first feature curve and the second feature curve.

In an embodiment of the present disclosure, if only one preset part is selected and two or more first feature curves and two or more second feature curves participate in the above screening, for any group of first feature curve and corresponding second feature curve, the sum of the distances of the points with the point identifications on the group of first feature curve and second feature curve may be calculated in the above manner. Then, an accumulated value of the sums of the distances of the points with the point identifications on all the groups of first feature curves and second feature curves is taken as the offset distance of the preset part between the object model and the corresponding reference model.

In an embodiment of the present disclosure, if more than two preset parts are selected to participate in the screening, for each preset part, the offset distance corresponding to the preset part may be calculated in the above-mentioned manner.

Then, the following steps are further performed:

(a2) calculating a comprehensive offset distance between the object model and the reference models based on pre-configured weights of the preset parts and the offset distances corresponding to the preset parts.

The weight of each preset part of the present embodiment can be set according to actual conditions; for example, the eye and the mouth are obviously characterized in the face, and the weights of the eye and the mouth can be set to be higher.

(b2): screening the identification of the target reference model matched with the object model from the reference model library based on the comprehensive offset distance between the object model and each reference model.

Specifically, an identification of the reference model with the minimum comprehensive offset distance may be screened from the multiple reference models in the reference model library as the identification of the target reference model matched with the object model.

In this way, the target reference model which is most matched with the object model can be screened from the reference model library quite efficiently, accurately and reasonably.

In addition, optionally, in an embodiment of the present disclosure, the step S101 in the embodiment shown in FIG. 1 may also be implemented in any one of the following ways:

A: screening the identification of the target reference model matched with the object model from the reference model library based on attribute information of the object model and attribute information of each reference model in the reference model library; or In practical application, when each digital human model is established, corresponding attribute information may also be configured to describe or define the model. For example, the attribute information may be a middle-aged female, a child, an elderly male, or the like. At this point, according to the attribute information of the object model, the identification of the reference model with the same attribute information can be screened from the model reference library as the identification of the target reference model.

B: showing the attribute information of each reference model in the reference model library to a user; and receiving a user selected identification of the target reference model matched with the object model.

In this mode, the identification of the target reference model matched with the object model is artificially selected by the user.

In a word, no matter which way is adopted, the identification of the target reference model matched with the object model can be efficiently and accurately acquired.

S205: acquiring an expression library of the target reference model based on the identification of the target reference model.

S206: integrally registering the target reference model with the object model.

In the present embodiment, the target reference model may be adjusted to realize the integral registration of the object model and the target reference model, so as to align head positions thereof, and the target reference model and the object model have consistent coordinate system directions and sizes by shifting, rotating and/or scaling. The step is used to roughly determine positions and sizes corresponding to the five sense organs of the model to facilitate matching of key features in a next step.

S207: registering a key feature corresponding to an expression of the target reference model with a key feature of the object model.

In the present embodiment, as an example, only one key feature is involved in the expression. For example, the key feature may include the left eye, the right eye, the mouth, or the like. In order to realize accurate expression migration, in implementation of the registration of the key features in the present embodiment, operations, such as shifting, rotating and/or scaling, may be performed on the target reference model, such that key points of the key feature corresponding to the expression and the key feature of the object model have consistent coordinates. For example, the registration of the left eye can be shown as the same coordinates of the two canthi of the left eye. The registration of the mouth can be shown as the same coordinates of the two mouth corners of the mouth.

By adopting the step, any key feature of any expression can be registered.

S208: acquiring a first size ratio of the expression based on point cloud data of a key feature corresponding to a last frame of the expression of the target reference model and point cloud data of the key feature of the target reference model in a natural state.

S209: acquiring point cloud data of a key feature corresponding to a last frame of an expression to be transferred of the object model based on the first size ratio of the expression and point cloud data of the key feature of the object model in a natural state, so as to obtain the last frame of the expression of the object model.

In the present embodiment, when the last frame of the expression is transferred, direct migration may have mismatching, or the like. For example, when normal lips are transferred to a small cherrylike mouth, European-style large lips, or the like, obvious contradictions can be generated by a width change of the lips during smiling and a stretching change of the lower jaw during mouth opening. In order to solve such problems, in the present embodiment, a length, a width, and a height of a point cloud of the key feature corresponding to the last frame of the expression may be calculated based on the point cloud data of the key feature corresponding to the last frame of the expression of the target reference model. Then, a length, a width and a height of a point cloud of the key feature in the natural state are calculated based on the point cloud data of the key feature of the target reference model in the natural state, and a ratio of the length of the point cloud of the key feature corresponding to the last frame of the expression to the corresponding length of the point cloud of the key feature in the natural state, a ratio of the width of the point cloud of the key feature corresponding to the last frame of the expression to the corresponding width of the point cloud of the key feature in the natural state, and a ratio of the height of the point cloud of the key feature corresponding to the last frame of the expression to the corresponding height of the point cloud of the key feature in the natural state are calculated as the first size ratio of the expression.

For example, for an open-mouth expression, coordinates of a highest point of an upper lip line and coordinates of a lowest point of a lower lip line of the mouth can be obtained based on point cloud data corresponding to a last frame of the open-mouth expression of the target reference model, so as to obtain a width of a point cloud of the last frame of the open-mouth expression of the target reference model; or the point cloud data of the target reference model in the natural state can be obtained, coordinates of a highest point of the lower lip line and coordinates of the lowest point of the lower lip line in the natural state are obtained, and then, the width of the point cloud of the target reference model in the natural state is obtained; and then, the width of the point cloud of the last frame of the open-mouth expression of the target reference model is divided by the width of the point cloud in the natural state to obtain a width ratio of the open-mouth expression. In the same way, an abscissa distance between the two mouth corners can be taken as the length of the point cloud, and according to the above mode, a length ratio of the open-mouth expression is correspondingly obtained; a distance between an outermost point of the lip and a height of the mouth corner at an innermost layer is taken as the height of the point cloud, and a height ratio of the open-mouth expression is correspondingly obtained according to the above mode; and therefore, the ratios of three coordinate axis directions in the first size ratio are obtained.

Next, according to the first size ratio of the expression and the point cloud data of the key feature of the object model in the natural state, the point cloud data of the key feature corresponding to the last frame when the object model makes the expression, i.e., the coordinates corresponding to each point in the point cloud of the key feature corresponding to the last frame, can be obtained, and scaling in different ratios can be performed on three coordinate axis directions in an updated migration result, such that after the transferring to the object model, the point cloud of the key feature corresponding to the last frame of the expression is better matched with the object model.

Experiments prove that after the processing in the steps S208 and S209, a negative influence of volume deformation during the expression migration is reduced, and amplitudes of unreasonable expressions, such as mouth opening, smiling, pouting, or the like, of a small cherrylike mouth are obviously inhibited.

It should be noted that, unlike global scaling of linear migration, in this step, transformation of each point is scaled differently in the three axis directions, thus ensuring that an excessive change is suppressed and similar parts are maintained.

The above-mentioned steps S206-S209 are an implementation of the step S103 in the embodiment shown in FIG. 1.

S210: transferring the point cloud data of the key feature corresponding to the last frame of the expression to be transferred of the object model onto the object model.

S211: acquiring a third feature curve corresponding to the last frame of the expression and a fourth feature curve corresponding to the last frame of the expression on the target reference model after the transferring to the object model.

S212: adjusting the third feature curve by taking the fourth feature curve as a constraint.

For example, the third feature curve and the fourth feature curve of the present embodiment may be feature curves presented in a state where the digital human model makes an expression. For example, for a closed-eye expression, a coincidence curve of the upper eyelid and the lower eyelid may be used as the third feature curve and the fourth feature curve; for a pouting expression, a curve of the closed and forwards-protruding mouth may be taken as the third feature curve and the fourth feature curve; for a puckering expression, a curve formed by the closed and inwards-rolling lips can be used as the third feature curve and the fourth feature curve. When the expression is transferred on different models, the third feature curve and the fourth feature curve are quite prone to show inconsistency, and based on this, in the present embodiment, the fourth feature curve corresponding to the last frame of the expression on the target reference model can be used as a constraint to adjust the third feature curve corresponding to the last frame of the expression after the transferring to the object model, such that the expression can be more accurately fused onto the object model, the expression can be more completely expressed on the object model, and meanwhile, topology around the feature of the expression transferred on the object model is ensured to evenly change along with the expression, and an overall fusion degree is quite high.

Specifically, in the present embodiment, the third feature curve is adjusted with the fourth feature curve as the constraint, the third feature curve and the fourth feature curve may also be referred to as dynamic curves, and this adjustment manner may also be referred to as adjustment based on a dynamic curve constraint. The dynamic curve may be a mathematical relationship used in a technical pipeline of the figure of the digital human. When a group of points are connected in series to form a space curve in the dynamic curve, a change of any point on the curve causes changes of other points on the curve. On a surface of the digital human model, such as the reference model and the object model, all the points are connected with surrounding adjacent points through straight lines to form a grid structure. The third and fourth feature curves are also formed by sides of the grid structure. The grid structure includes transverse sides and longitudinal sides, and the third and fourth feature curves in the present embodiment are generally transverse sides. When the third feature curve is adjusted with the fourth feature curve as the constraint, a position of each point in the third feature curve is adjusted, such that the third feature curve is completely consistent with the fourth feature curve, or a distance between the third feature curve and the fourth feature curve is smaller than a quite small preset threshold.

Figure 3:
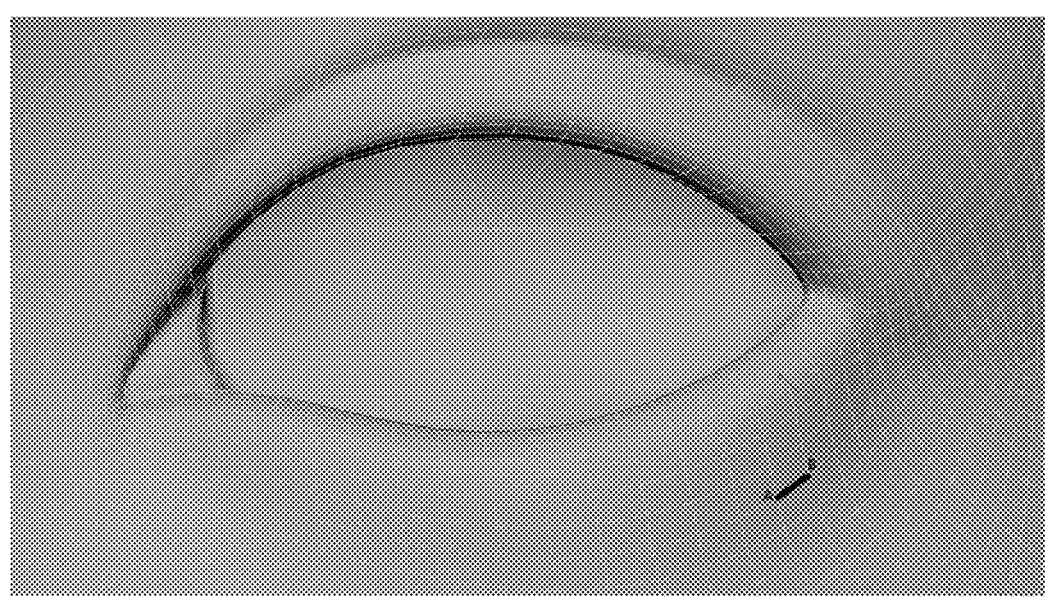
FIG. 3 is a schematic diagram of an eye structure of an object model in the present disclosure.

FIG. 3 is a schematic diagram of an eye structure of an object model in the present disclosure. As shown in FIG. 3, the feature curve indicated by the arrow may be one third feature curve. Due to the features of the sides and surfaces existing in the grid structure of the object model, a topological structure of the feature curve in the grid structure cannot be changed by the adjusted third feature curve. Therefore, the change of the third feature curve is inevitably transmitted to adjacent surface and adjacent points in sequence. In marks of the five sense organs, this transmission may be attenuated outwards by outer contour feature curves of the five sense organs. In other words, in order to enable smoother adjustment, in practical application, the change of the third feature curve may be attenuated outwards by a preset number of curves. The preset number may be set according to actual requirements, and may be 6, 8, 10 or other values, for example. The third feature curve is adjusted by a maximum magnitude to be matched with the corresponding fourth feature curve in the target reference model. Compared with the adjustment magnitude of the third feature curve, an adjustment magnitude of each of a preset number of feature curves adjacent to the third feature curve is reduced gradually with an increase of a distance from the third feature curve until a last step of the current adjustment of the last curve of the preset number of adjacent feature curves is completed.

Based on the above manner, under the effect of the current migration expression result of the object model, the third feature curve is restricted by the constraint of the dynamic curve, and a feature line and topological lines around a feature successively get close to the fourth feature curve. Therefore, topological features under the expression can be completely transferred into the object model.

S213: smoothing a joint between the point cloud of the key feature corresponding to the last frame of the expression after the transferring to the object model and the original point cloud of the object model.

In order to enable the point cloud of the key feature corresponding to the last frame of the transferred expression and the original point cloud of the object model to be more closely fused together, in the present embodiment, whether the joint of the point cloud and the original point cloud is smooth is further required to be detected. An unsmooth position is required to be smoothed correspondingly. For example, the side AB shown in FIG. 3 may be a joint between the point cloud of the key feature corresponding to the last frame of the transferred expression and the original point cloud of the object model, and the side AB is located in the point cloud of the key feature corresponding to the last frame of the transferred expression. During specific processing, whether an included angle between two adjacent transverse sides of the point B is greater than a preset threshold included angle may be detected, and the preset threshold included angle may be set according to an actual scenario, for example, may be 15 degrees, 20 degrees, 30 degrees, or the like, and is not limited herein. If yes, the joint is considered to be unsmooth, and a position of the point B is required to be adjusted to allow the included angle between the two adjacent transverse sides of the point B to be smaller than or equal to the preset threshold included angle. Similarly, an included angle between two adjacent longitudinal sides of the point B can be detected in a similar manner, and if the joint is unsmooth, the position of the point B is also adjusted. In a word, with the adjustment according to the above manner, each joint in the point cloud of the key feature corresponding to the last frame of the expression with the original point cloud of the object model is quite smooth, such that the point cloud of the key feature corresponding to the last frame of the expression can be perfectly fused with the original point cloud of the object model.

For example, when the transferring of the last frame of the expression is completed, a change of the joint between the point cloud of the last frame of the transferred expression and the original point cloud has a slight problem; for example, at an intersection of a plurality of five sense organ parts, such as two sides of the wing of the nose, a middle of the root of the nose, or the like, a line layout may be unsmooth in some cases. By adopting the smoothing solution of the present embodiment, such problems can be fully solved, and line smoothness is ensured.

The steps S210-S213 are complementary to the steps S206-S209, and can further enhance the transferring effect of the last frame of the expression, thus improving the accuracy and the migration efficiency of the expression migration.

S214: acquiring a second size ratio of an intermediate frame of the expression relative to the last frame of the expression based on point cloud data of a key feature corresponding to the intermediate frame of the expression in the expression library of the target reference model, the point cloud data of the key feature of the target reference model in the natural state and the point cloud data of the key feature corresponding to the last frame of the expression of the target reference model.

Specifically, the fourth feature curve corresponding to the last frame of the expression of the target reference model, a fifth feature curve corresponding to the intermediate frame of the expression, and a sixth feature curve in the natural state are obtained based on the point cloud data of the key feature corresponding to the intermediate frame of the expression in the expression library of the target reference model, the point cloud data of the key feature of the target reference model in the natural state, and the point cloud data of the key feature corresponding to the last frame of the expression of the target reference model. The fourth, fifth and sixth feature curves are feature curves of the key features in the target reference model.

Similarly, for the open-mouth expression, the fourth feature curve may correspond to the upper lip line corresponding to maximum mouth opening, the fifth feature curve may be the upper lip line of a certain intermediate process in a mouth opening process, and the sixth feature curve is a closing line of the closed upper and lower lips when the mouth is not opened. During specific calculation, the highest point on the upper lip line may be used as the key point, a distance difference between the key point on the fifth feature curve and the key point on the upper lip line on the fourth feature curve is taken and divided by a distance difference between the key point on the fourth feature curve and the key point on the upper lip line on the sixth feature curve, so as to obtain a ratio of a height of the intermediate frame of the open-mouth expression relative to the width of the last frame as a width ratio in the second size ratio. Similarly, a length ratio and a height ratio in the second size ratio can also be obtained in a similar manner in combination with the determination of the length and height in the first size ratio.

S215: obtaining an intermediate frame of the expression of the object model based on the second size ratio of the intermediate frame of the expression relative to the last frame and the last frame of the expression of the object model.

The step may include the following steps during implementation:

(a3) obtaining a corresponding reference feature curve of the intermediate frame of the expression of the object model based on the second size ratio of the intermediate frame of the expression relative to the last frame and the corresponding third feature curve of the last frame of the expression of the object model;

(b3) transferring the point cloud data of the key feature corresponding to the intermediate frame of the expression of the target reference model onto the object model;

(c3) acquiring a seventh feature curve corresponding to the intermediate frame of the expression after the transferring to the object model; and (d3) adjusting the seventh feature curve with the reference feature curve as a constraint.

In the present embodiment, the reference feature curve is a reference feature curve which theoretically should correspond to the intermediate frame after the expression migration. The seventh feature curve is the actual reference feature curve after the intermediate frame of the expression is transferred, and in order to improve an intermediate frame transferring effect, dynamic curve adjustment is required to be performed using the step (d3).

Specifically, as with the implementation of the step S212 in the above embodiment, implementation of the step (d3) can realize outward-attenuation-type feature curve adjustment, and reference may be made to the related description of the above embodiment for details, which are not repeated herein. Further, the transferred intermediate frame may be further smoothed using the above manner of the step S213, which is not repeated herein.

The steps S214 and S215 mean that if the expression in the expression library includes the intermediate frame, the intermediate frame is also required to be transferred.

In traditional expression binding, only two pieces of data of a natural state and an expression frame exist, and an amplitude change of the expression is an interpolation of the natural state and a target frame. This method cannot show details of a real character in an expression change process, such as the situation that when a person smiles, the dimple is partly hidden and partly visible.

From the expression migration perspective, the intermediate frame, a first frame and the last frame of the expression have a certain nonlinear relationship.

In the present embodiment, the change constraint of each intermediate frame relative the last frame is established by sampling the feature curve in the intermediate frame and the last frame, and when the intermediate frame is transferred, the feature curve of the intermediate frame is retained, and the change constraint relative to the last frame is also required to be added to the feature curve, thus effectively improving the migration efficiency of the intermediate frame.

In the present embodiment, the transferred intermediate frame means that a plurality of intermediate expressions of the intermediate frame changing nonlinearly are added between the natural state and the last frame. Therefore, the change of one expression from 0 to 1 is evolved from a linear change to a nonlinear change, and detail changes, such as sequential appearance and disappearance of the dimple, sequential protrusion and straightening of a lip mark, or the like, can be realized, such that the transferred expression is more natural, reasonable and efficient.

By continuously repeating the transferring step using the above steps, all the expressions in the target reference model can be transferred to the object model one by one, and the transferred expressions of the object model can reach a better level based on the series of constraints.

With the method for transferring facial expression of digital human according to the present embodiment, the expressions in the expression library of the target reference model can be quickly and efficiently transferred to the object model in the above manner. Moreover, the expression migration process has a high speed and low computing power, and is run in real time in the background in a figure production project, minute-level automatic binding can be completed, and face capture driving can be further directly performed to preview an effect. The method does not depend on support of a device with large computing power, and does not need a long generation waiting time, and the expression migration is quite efficient and accurate.

Further, for the scenario that the effect is difficult to completely ensure by other means, such as eye closing, pouting, puckering, or the like, the method for transferring facial expression of digital human according to the present embodiment can completely transfer the expression and effectively guarantee the expression transferring effect.

Moreover, the method for transferring facial expression of digital human according to the present embodiment supports 4D nonlinear transition. The expression transition means of the nonlinear interpolation of the intermediate frame can also be supported. Under the constraint action, the effect of the transferred 4D nonlinear expression can be more effectively guaranteed.

Figure 4:
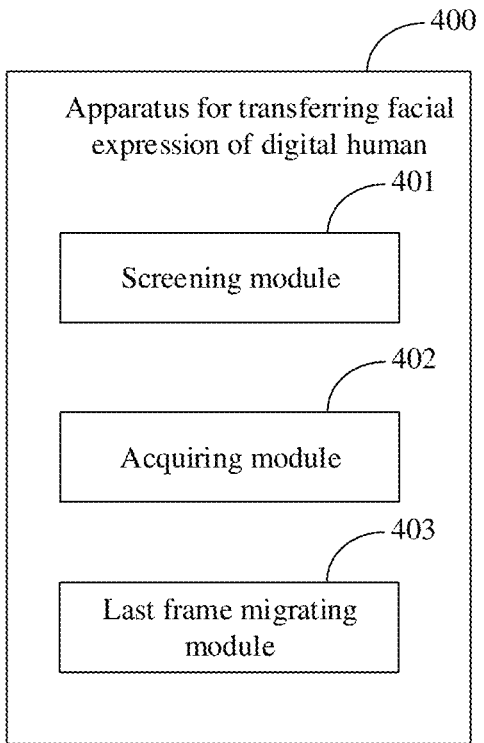
FIG. 4 is a schematic diagram according to a third embodiment of the present disclosure.

FIG. 4 is a schematic diagram according to a third embodiment of the present disclosure. As shown in FIG. 4, the present embodiment provides an apparatus 400 for transferring facial expression of digital human, including:

a screening module 401 configured to screen an identification of a target reference model matched with an object model from a preset reference model library, the reference model library including a plurality of reference models;

an acquiring module 402 configured to acquire an expression library of the target reference model based on the identification of the target reference model; and a last frame transferring module 403 configured to transfer a last frame of an expression in the expression library of the target reference model into the object model to obtain a last frame of an expression of the object model.

The apparatus 400 for transferring facial expression of digital human according to the present embodiment has the same implementation as the above-mentioned relevant method embodiment by adopting the above-mentioned modules to implement the implementation principle and the technical effects of the digital-human expression migration, and for details, reference may be made to the description of the above-mentioned relevant method embodiment, and details are not repeated herein.

Figure 5:
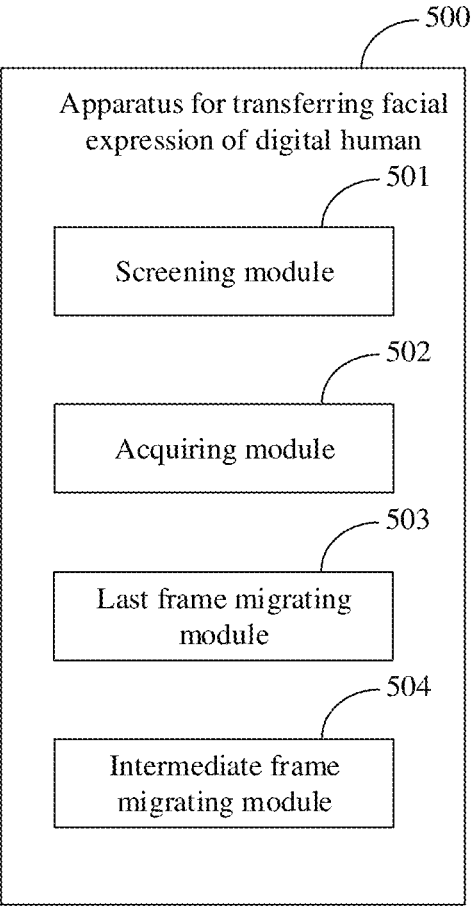
FIG. 5 is a schematic diagram according to a fourth embodiment of the present disclosure.

FIG. 5 is a schematic diagram according to a fourth embodiment of the present disclosure. The technical solution of an apparatus 500 for transferring facial expression of digital human according to the present embodiment of the present disclosure is further described in more detail based on the technical solution of the above-mentioned embodiment shown in FIG. 4. As shown in FIG. 5, the 500 for transferring facial expression of digital human according to the present embodiment includes modules with the same names and functions as those in FIG. 4: a screening module 501, an acquiring module 502 and a last frame transferring module 503.

In the present embodiment, the screening module 501 is configured to:

screen the identification of the target reference model matched with the object model from the reference model library based on attribute information of the object model and attribute information of each reference model in the reference model library.

Or optionally, in one embodiment of the present disclosure, the screening module 501 is configured to:

show the attribute information of each reference model in the reference model library to a user; and receive the user selected target reference model matched with the object model.

Or optionally, in one embodiment of the present disclosure, the screening module 501 is configured to:

acquire a first feature curve of a preset part from the object model;

acquire a second feature curve of the preset part from each reference model;

calculate an offset distance of the preset part between the object model and each reference model based on the first feature curve and each second feature curve; and screen the identification of the target reference model matched with the object model from the reference model library based on the offset distance of the preset part between the object model and each reference model.

Further optionally, in one embodiment of the present disclosure, the screening module 501 is configured to: acquire coordinates of each point on the first feature curve and each second feature curve;

calculate a distance of points with same point identifications on the first feature curve and each second feature curve based on the coordinates of the points on the first feature curve and each second feature curve;

add the distances of the points with the point identifications on the first feature curve and each second feature curve to obtain a point distance sum; and obtain the offset distance of the preset part between the object model and each reference model based on the point distance sum and a number of the points included on the first feature curve.

Further optionally, in one embodiment of the present disclosure, the screening module 501 is configured to:

screen an identification of the reference model with the minimum offset distance of the preset part from the multiple reference models in the reference model library as the identification of the target reference model matched with the object model.

Further optionally, in one embodiment of the present disclosure, the screening module 501 is configured to: if two or more preset parts are included, calculate a comprehensive offset distance between the object model and the reference models based on pre-configured weights of the preset parts and the offset distances corresponding to the preset parts; and screen the identification of the target reference model matched with the object model from the reference model library based on the comprehensive offset distance between the object model and each reference model.

Further optionally, in one embodiment of the present disclosure, the last frame transferring module 503 is configured to:

integrally register the target reference model with the object model;

register a key feature corresponding to an expression of the target reference model with a key feature of the object model;

acquire a first size ratio of the expression based on point cloud data of a key feature corresponding to a last frame of the expression of the target reference model and point cloud data of the key feature of the target reference model in a natural state; and acquire point cloud data of a key feature corresponding to a last frame of the expression to be transferred of the object model based on the first size ratio of the expression and point cloud data of the key feature of the object model in a natural state, so as to obtain the last frame of the expression of the object model.

Further optionally, in one embodiment of the present disclosure, the last frame transferring module 503 is configured to:

transfer the point cloud data of the key feature corresponding to the last frame of the expression to be transferred of the object model onto the object model;

acquire a third feature curve corresponding to the last frame of the expression and a fourth feature curve corresponding to the last frame of the expression on the target reference model after the transferring to the object model;

adjust the third feature curve by taking the fourth feature curve as a constraint; and smooth a joint between the point cloud of the key feature corresponding to the last frame of the expression after the transferring to the object model and the original point cloud of the object model.

Further optionally, as shown in FIG. 5, in one embodiment of the present disclosure, the apparatus 500 for transferring facial expression of digital human further includes:

an intermediate frame transferring module 504 configured to, if the expression library further includes an intermediate frame of the expression, transfer the intermediate frame of the expression in the expression library of the target reference model into the object model to obtain an intermediate frame of the expression of the object model.

Further optionally, in one embodiment of the present disclosure, the intermediate frame transferring module 504 is configured to:

acquire a second size ratio of the intermediate frame of the expression relative to the last frame of the expression based on point cloud data of a key feature corresponding to the intermediate frame of the expression in the expression library of the target reference model, the point cloud data of the key feature of the target reference model in the natural state and the point cloud data of the key feature corresponding to the last frame of the expression of the target reference model; and obtain an intermediate frame of the expression of the object model based on the second size ratio of the intermediate frame of the expression relative to the last frame and the last frame of the expression of the object model.

Further optionally, in one embodiment of the present disclosure, the intermediate frame transferring module 504 is configured to:

obtain the fourth feature curve corresponding to the last frame of the expression of the target reference model, a fifth feature curve corresponding to the intermediate frame of the expression, and a sixth feature curve in the natural state based on the point cloud data of the key feature corresponding to the intermediate frame of the expression in the expression library of the target reference model, the point cloud data of the key feature of the target reference model in the natural state, and the point cloud data of the key feature corresponding to the last frame of the expression of the target reference model; and acquire the second size ratio of the intermediate frame of the expression relative to the last frame based on coordinates of key points on the fourth feature curve, the fifth feature curve and the sixth feature curve.

Further optionally, in one embodiment of the present disclosure, the intermediate frame transferring module 504 is configured to:

obtain a corresponding reference feature curve of the intermediate frame of the expression of the object model based on the second size ratio of the intermediate frame of the expression relative to the last frame and the corresponding third feature curve of the last frame of the expression of the object model;

transfer the point cloud data of the key feature corresponding to the intermediate frame of the expression of the target reference model onto the object model;

acquire a seventh feature curve corresponding to the intermediate frame of the expression after the transferring to the object model; and adjust the seventh feature curve with the reference feature curve as a constraint.

The apparatus 500 for transferring facial expression of digital human according to the present embodiment has the same implementation as the above-mentioned relevant method embodiment by adopting the above-mentioned modules to implement the implementation principle and the technical effects of the digital-human expression migration, and for details, reference may be made to the description of the above-mentioned relevant method embodiment, and details are not repeated herein.

In the technical solution of the present disclosure, the acquisition, storage and application of involved user personal information are in compliance with relevant laws and regulations, and do not violate public order and good customs.

According to the embodiment of the present disclosure, there are also provided an electronic device, a readable storage medium and a computer program product.

Figure 6:
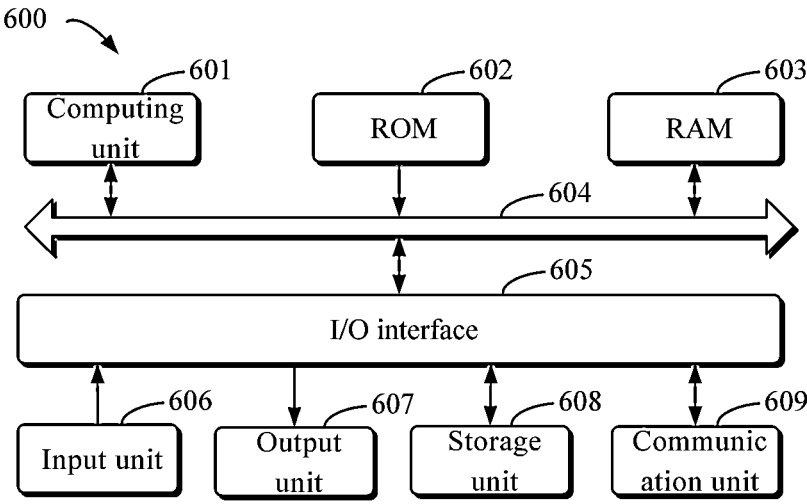
FIG. 6 is a block diagram of an electronic device configured to implement a method according to the embodiment of the present disclosure.

FIG. 6 shows a schematic block diagram of an exemplary electronic device 600 which may be configured to implement the embodiment of the present disclosure. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital assistants, cellular telephones, smart phones, wearable devices, and other similar computing apparatuses. The components shown herein, their connections and relationships, and their functions, are meant to be exemplary only, and are not meant to limit implementation of the present disclosure described and/or claimed herein.

As shown in FIG. 6, the device 600 includes a computing unit 601 which may perform various appropriate actions and processing operations according to a computer program stored in a read only memory (ROM) 602 or a computer program loaded from a storage unit 608 into a random access memory (RAM) 603. Various programs and data necessary for the operation of the device 600 may be also stored in the RAM 603. The computing unit 601, the ROM 602, and the RAM 603 are connected with one other through a bus 604. An input/output (I/O) interface 605 is also connected to the bus 604.

The plural components in the device 600 are connected to the I/O interface 605, and include: an input unit 606, such as a keyboard, a mouse, or the like; an output unit 607, such as various types of displays, speakers, or the like; the storage unit 608, such as a magnetic disk, an optical disk, or the like; and a communication unit 609, such as a network card, a modem, a wireless communication transceiver, or the like. The communication unit 609 allows the device 600 to exchange information/data with other devices through a computer network, such as the Internet, and/or various telecommunication networks.

The computing unit 601 may be a variety of general and/or special purpose processing components with processing and computing capabilities. Some examples of the computing unit 601 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 601 performs the methods and processing operations described above, such as the method according to the present disclosure. For example, in some embodiments, the method according to the present disclosure may be implemented as a computer software program tangibly contained in a machine readable medium, such as the storage unit 608. In some embodiments, part or all of the computer program may be loaded and/or installed into the device 600 via the ROM 602 and/or the communication unit 609. When the computer program is loaded into the RAM 603 and executed by the computing unit 601, one or more steps of the method according to the present disclosure may be performed. Alternatively, in other embodiments, the computing unit 601 may be configured to perform the method according to the present disclosure by any other suitable means (for example, by means of firmware).

Various implementations of the systems and technologies described herein above may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input apparatus, and at least one output apparatus.

Program codes for implementing the method according to the present disclosure may be written in any combination of one or more programming languages. These program codes may be provided to a processor or a controller of a general purpose computer, a special purpose computer, or other programmable data processing apparatuses, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server or a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A computer-implemented method for transferring an expression of a target reference model to an object model of a digital human, comprising:

selecting an identification of the target reference model matched with the object model from a preset reference model library, the reference model library comprising a plurality of reference models;

acquiring an expression library of the target reference model based on the identification of the target reference model, wherein the expression library of the target reference model comprises a plurality of expressions which are stored in a form of point cloud data; and transferring a last frame of an expression in the expression library of the target reference model into the object model to obtain a last frame of an expression of the object model, wherein transferring the last frame of the expression in the expression library of the target reference model into the object model to obtain the last frame of the expression of the object model comprises:

acquiring a first size ratio of the expression based on point cloud data of a key feature corresponding to a last frame of the expression of the target reference model and point cloud data of the key feature of the target reference model in a natural state, wherein the first size ratio of the expression comprises a ratio of the length of the point cloud of the key feature corresponding to the last frame of the expression to the corresponding length of the point cloud of the key feature in the natural state, a ratio of the width of the point cloud of the key feature corresponding to the last frame of the expression to the corresponding width of the point cloud of the key feature in the natural state, and a ratio of the height of the point cloud of the key feature corresponding to the last frame of the expression to the corresponding height of the point cloud of the key feature in the natural state; and acquiring point cloud data of a key feature corresponding to a last frame of the expression to be transferred of the object model based on the first size ratio of the expression and point cloud data of the key feature of the object model in a natural state, so as to obtain the last frame of the expression of the object model.

2. The method according to claim 1, wherein the selecting an identification of a target reference model matched with an object model from a preset reference model library comprises:

selecting the identification of the target reference model matched with the object model from the reference model library based on attribute information of the object model and attribute information of each reference model in the reference model library.

3. The method according to claim 1, wherein the selecting an identification of a target reference model matched with an object model from a preset reference model library comprises:

showing attribute information of each reference model in the reference model library to a user; and receiving the user selected target reference model matched with the object model.

4. The method according to claim 1, wherein the selecting an identification of a target reference model matched with an object model from a preset reference model library comprises:

acquiring a first feature curve of a preset part from the object model;

acquiring a second feature curve of the preset part from each reference model;

calculating an offset distance of the preset part between the object model and each reference model based on the first feature curve and each second feature curve; and selecting the identification of the target reference model matched with the object model from the reference model library based on the offset distance of the preset part between the object model and each reference model.

5. The method according to claim 4, wherein the calculating an offset distance of the preset part between the object model and each reference model based on the first feature curve and the second feature curve comprises:

acquiring coordinates of each point on the first feature curve and each second feature curve;

calculating a distance of points with same point identifications on the first feature curve and each second feature curve based on the coordinates of the points on the first feature curve and each second feature curve;

adding the distances of the points with the point identifications on the first feature curve and each second feature curve to obtain a point distance sum; and obtaining the offset distance of the preset part between the object model and each reference model based on the point distance sum and a number of the points comprised on the first feature curve.

6. The method according to claim 5, wherein the selecting the identification of the target reference model matched with the object model from the reference model library based on the offset distance of the preset part between the object model and each reference model comprises:

selecting an identification of the reference model with the minimum offset distance of the preset part from the multiple reference models in the reference model library as the identification of the target reference model matched with the object model.

7. The method according to claim 5, wherein the selecting the identification of the target reference model matched with the object model from the reference model library based on the offset distance of the preset part between the object model and each reference model comprises:

if two or more preset parts are comprised, calculating a comprehensive offset distance between the object model and the reference models based on pre-configured weights of the preset parts and the offset distances corresponding to the preset parts; and selecting the identification of the target reference model matched with the object model from the reference model library based on the comprehensive offset distance between the object model and each reference model.

8. The method according to claim 1, wherein before acquiring the first size ratio of the expression based on point cloud data of the key feature corresponding to the last frame of the expression of the target reference model and point cloud data of the key feature of the target reference model in the natural state, the method further comprises:

integrally registering the target reference model with the object model.

9. The method according to claim 8, after the acquiring point cloud data of a key feature corresponding to a last frame of the expression to be transferred of the object model based on the size ratio of the expression and point cloud data of the key feature of the object model in a natural state, and before the obtaining the last frame of the expression of the object model, further comprising:

transferring the point cloud data of the key feature corresponding to the last frame of the expression to be transferred of the object model onto the object model;

acquiring a third feature curve corresponding to the last frame of the expression and a fourth feature curve corresponding to the last frame of the expression on the target reference model after the transferring to the object model;

adjusting the third feature curve by taking the fourth feature curve as a constraint; and smoothing a joint between the point cloud of the key feature corresponding to the last frame of the expression after the transferring to the object model and the original point cloud of the object model.

10. The method according to claim 1, after the transferring a last frame of an expression in the expression library of the target reference model into the object model to obtain a last frame of an expression of the object model, further comprising:

if the expression library further comprises an intermediate frame of the expression, transferring the intermediate frame of the expression in the expression library of the target reference model into the object model to obtain an intermediate frame of the expression of the object model.

11. The method according to claim 10, wherein the transferring the intermediate frame of the expression in the expression library of the target reference model into the object model to obtain an intermediate frame of the expression of the object model comprises:

acquiring a second size ratio of the intermediate frame of the expression relative to the last frame of the expression based on point cloud data of a key feature corresponding to the intermediate frame of the expression in the expression library of the target reference model, the point cloud data of the key feature of the target reference model in the natural state and the point cloud data of the key feature corresponding to the last frame of the expression of the target reference model; and obtaining an intermediate frame of the expression of the object model based on the second size ratio of the intermediate frame of the expression relative to the last frame and the last frame of the expression of the object model.

12. The method according to claim 11, wherein the acquiring a second size ratio of the intermediate frame of the expression relative to the last frame of the expression based on point cloud data of a key feature corresponding to the intermediate frame of the expression in the expression library of the target reference model, the point cloud data of the key feature of the target reference model in the natural state and the point cloud data of the key feature corresponding to the last frame of the expression of the target reference model comprises:

obtaining the fourth feature curve corresponding to the last frame of the expression of the target reference model, a fifth feature curve corresponding to the intermediate frame of the expression, and a sixth feature curve in the natural state based on the point cloud data of the key feature corresponding to the intermediate frame of the expression in the expression library of the target reference model, the point cloud data of the key feature of the target reference model in the natural state, and the point cloud data of the key feature corresponding to the last frame of the expression of the target reference model; and acquiring the second size ratio of the intermediate frame of the expression relative to the last frame based on coordinates of key points on the fourth feature curve, the fifth feature curve and the sixth feature curve.

13. The method according to claim 11, wherein the obtaining an intermediate frame of the expression of the object model based on the second size ratio of the intermediate frame of the expression relative to the last frame and the last frame of the expression of the object model comprises:

obtaining a corresponding reference feature curve of the intermediate frame of the expression of the object model based on the second size ratio of the intermediate frame of the expression relative to the last frame and the corresponding third feature curve of the last frame of the expression of the object model;

transferring the point cloud data of the key feature corresponding to the intermediate frame of the expression of the target reference model onto the object model;

acquiring a seventh feature curve corresponding to the intermediate frame of the expression after the transferring to the object model; and adjusting the seventh feature curve with the reference feature curve as a constraint.

14. An electronic device, comprising:

at least one processor; and a memory connected with the at least one processor communicatively;

wherein the memory stores instructions executable by the at least one processor to enable the at least one processor to perform a method for transferring an expression of a target reference model to an object model of a digital human, the method for transferring the expression of the target reference model to the object model of the digital human comprising:

selecting an identification of the target reference model matched with the object model from a preset reference model library; the reference model library comprising a plurality of reference models;

acquiring an expression library of the target reference model based on the identification of the target reference model, wherein the expression library of the target reference model comprises a plurality of expressions which are stored in a form of point cloud data; and transferring a last frame of an expression in the expression library of the target reference model into the object model to obtain a last frame of an expression of the object model, wherein transferring the last frame of the expression in the expression library of the target reference model into the object model to obtain the last frame of the expression of the object model comprises:

acquiring a first size ratio of the expression based on point cloud data of a key feature corresponding to a last frame of the expression of the target reference model and point cloud data of the key feature of the target reference model in a natural state, wherein the first size ratio of the expression comprises a ratio of the length of the point cloud of the key feature corresponding to the last frame of the expression to the corresponding length of the point cloud of the key feature in the natural state, a ratio of the width of the point cloud of the key feature corresponding to the last frame of the expression to the corresponding width of the point cloud of the key feature in the natural state, and a ratio of the height of the point cloud of the key feature corresponding to the last frame of the expression to the corresponding height of the point cloud of the key feature in the natural state; and acquiring point cloud data of a key feature corresponding to a last frame of the expression to be transferred of the object model based on the first size ratio of the expression and point cloud data of the key feature of the object model in a natural state, so as to obtain the last frame of the expression of the object model.

15. The electronic device according to claim 14, wherein the selecting an identification of a target reference model matched with an object model from a preset reference model library comprises:

selecting the identification of the target reference model matched with the object model from the reference model library based on attribute information of the object model and attribute information of each reference model in the reference model library.

16. The electronic device according to claim 14, wherein the selecting an identification of a target reference model matched with an object model from a preset reference model library comprises:

showing attribute information of each reference model in the reference model library to a user; and receiving the user selected target reference model matched with the object model.

17. The electronic device according to claim 14, wherein the selecting an identification of a target reference model matched with an object model from a preset reference model library comprises:

acquiring a first feature curve of a preset part from the object model;

acquiring a second feature curve of the preset part from each reference model;

calculating an offset distance of the preset part between the object model and each reference model based on the first feature curve and each second feature curve; and selecting the identification of the target reference model matched with the object model from the reference model library based on the offset distance of the preset part between the object model and each reference model.

18. The electronic device according to claim 17, wherein the calculating an offset distance of the preset part between the object model and each reference model based on the first feature curve and the second feature curve comprises:

acquiring coordinates of each point on the first feature curve and each second feature curve;

calculating a distance of points with same point identifications on the first feature curve and each second feature curve based on the coordinates of the points on the first feature curve and each second feature curve;

adding the distances of the points with the point identifications on the first feature curve and each second feature curve to obtain a point distance sum; and obtaining the offset distance of the preset part between the object model and each reference model based on the point distance sum and a number of the points comprised on the first feature curve.

19. The electronic device according to claim 18, wherein the selecting the identification of the target reference model matched with the object model from the reference model library based on the offset distance of the preset part between the object model and each reference model comprises:

selecting an identification of the reference model with the minimum offset distance of the preset part from the multiple reference models in the reference model library as the identification of the target reference model matched with the object model.

20. A non-transitory computer readable storage medium with computer instructions stored thereon, wherein the computer instructions are used for causing a computer to perform a method for transferring an expression of a target reference model to an object model of a digital human, the method for transferring the expression of the target reference model to the object model of the digital human comprising:

selecting an identification of the target reference model matched with the object model from a preset reference model library; the reference model library comprising a plurality of reference models;

acquiring an expression library of the target reference model based on the identification of the target reference model, wherein the expression library of the target reference model comprises a plurality of expressions which are stored in a form of point cloud data; and transferring a last frame of an expression in the expression library of the target reference model into the object model to obtain a last frame of an expression of the object model, wherein transferring the last frame of the expression in the expression library of the target reference model into the object model to obtain the last frame of the expression of the object model comprises:

acquiring a first size ratio of the expression based on point cloud data of a key feature corresponding to a last frame of the expression of the target reference model and point cloud data of the key feature of the target reference model in a natural state, wherein the first size ratio of the expression comprises a ratio of the length of the point cloud of the key feature corresponding to the last frame of the expression to the corresponding length of the point cloud of the key feature in the natural state, a ratio of the width of the point cloud of the key feature corresponding to the last frame of the expression to the corresponding width of the point cloud of the key feature in the natural state, and a ratio of the height of the point cloud of the key feature corresponding to the last frame of the expression to the corresponding height of the point cloud of the key feature in the natural state; and acquiring point cloud data of a key feature corresponding to a last frame of the expression to be transferred of the object model based on the first size ratio of the expression and point cloud data of the key feature of the object model in a natural state, so as to obtain the last frame of the expression of the object model.

*   *   *   *   *